Feb. 20, 1968   H. L. HOWE   3,369,751

FURNACE CONTROL

Filed March 30, 1966

INVENTOR.
HARLAN L. HOWE.
BY Frederick E. McMullen
ATTORNEY.

3,369,751
FURNACE CONTROL
Harlan L. Howe, Manlius, N.Y., assignor to Carrier Corporation, Syracuse, N.Y., a corporation of Delaware
Filed Mar. 30, 1966, Ser. No. 538,669
3 Claims. (Cl. 236—68)

ABSTRACT OF THE DISCLOSURE

A control arrangement for a furnace equipped with a two stage heat input, the control including separate thermal control members having pre-set cut in and cut out temperatures for each stage together with a third thermal control member having a pre-set cut in and cut out temperature substantially intermediate the temperatures regulating the first and second thermal control members, said third member being operable in a reverse temperature direction, the third thermal control member being effective to apply heat to at least the second stage thermal control member to bias the control temperature regulating its operation.

---

This invention relates to furnaces, and, more particularly, to a control system for a two-stage furnace.

The proper selection of control temperatures at which operation of the low and high heating stages of a multi-stage furnace are initiated presents a relatively complex problem. If the temperature settings of the thermostats controlling the low and high heating stages are set relatively close together, objectionable overheating can occur since the full heating capacity of the furnace may be applied prematurely. On the other hand, if the temperature settings of the thermostats are widely spaced to delay actuation of the high heating stage to give the control time to sense whether or not the first heating stage can sustain the heating demand, the area heated could become uncomfortably cool if the delay should prove to be too long. And, the heat supplied by the first stage, although unable to meet the instantaneous heating demand, nevertheless will slow up the rate at which temperatures within the area decrease to further delay actuation of the high heating stage.

It is a principal object of the present invention to provide a new and improved control for a multi-stage furnace.

It is a further object of the present invention to provide a control for a two-stage furnace incorporating a small heater actuatable in response to temperature conditions of the area heated to bias the temperature responsive control for the furnace high heat stage a preset number of degrees above the actual temperature of the area heated.

It is an object of the present invention to provide a control for a multi-stage furnace which effectively changes the differential between the temperatures at which the first and second heating stages are actuated when the demand for heat is relatively high to eliminate lag in the actuation of the second heating stage.

This invention relates to a furnace having first and second heating stages in which the combined heating capacity of the first and second stages is greater than the capacity of the first stage alone, comprising the combination of a first control effective at a first temperature to actuate the first stage; a second control effective at a second temperature to actuate the second stage; the first and second controls being arranged to respond to temperature conditions of the area heated; a heater adapted when energized to maintain temperatures circumadjacent the second control a predetermined number of degrees above the temperatures in the area thereby decreasing the response of the second control to actual temperatures in the area heated; and a third control effective at a third temperature to deenergize the heater, the third temperature being at least equal to the second temperature and no greater than the sum of the second temperature and the predetermined number of degrees generated by the heater, the third temperature being less than the first temperature so that at the first temperature the first control actuates the first stage to heat the area, while at the third temperature, the third control deenergizes the heater whereby temperature circumadjacent the second control relatively quickly decreases to the actual temperature of the area heated, the second control, during the temperature decrease, actuating the second stage at the second temperature.

Other objects and advantages will be apparent from the ensuing description in which.

Figure 1:
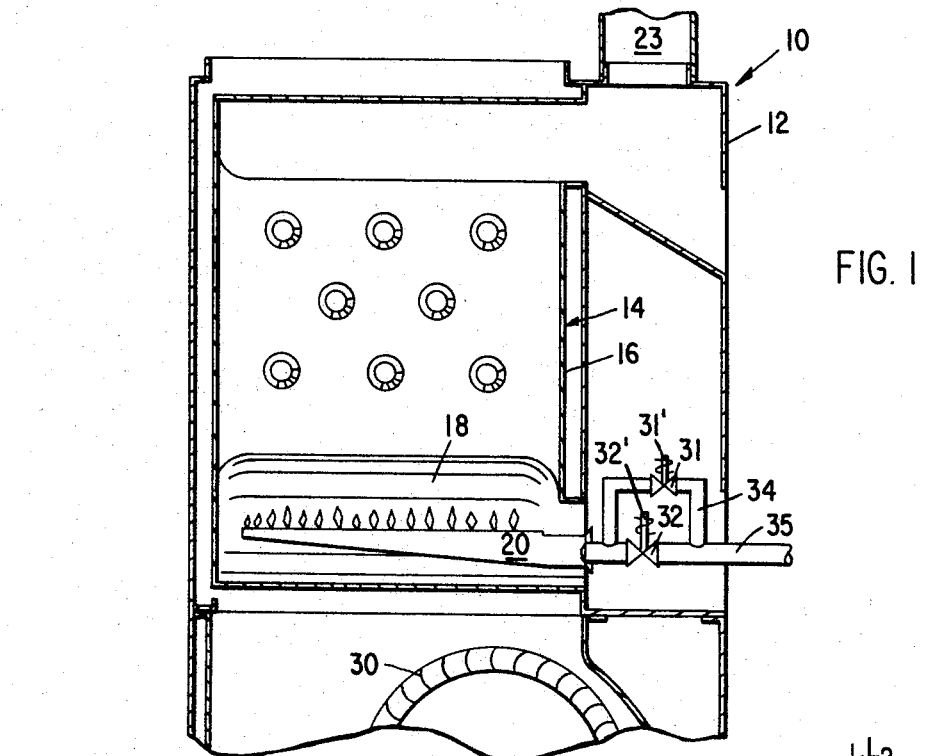
FIGURE 1 is a view partly in section of a multi-stage furnace incorporating the control of the present invention.

Referring to FIGURE 1 of the drawings there is shown, in exemplary detail, a furnace 10 of the type adapted to be regulated by the control arrangement of the present invention. Furnace 10 includes a housing 12 enclosing heating mechanism 14. Heating mechanism 14 includes plural heat exchangers 16 disposed in spaced side-by-side relation. Heat exchangers 16 open into combustion area 18 within which burner 20 is operatively disposed. The opposite ends of heat exchangers 16 connect to flue 23. Flue 23 conveys the products of combustion into the ambient.

Air from fan 30 flows between and around heat exchangers 16, the air being heated through contact with the relatively hot walls of heat exchangers 16 upon firing of burner 20. The inlet side of fan 30 communicates with a source of air to be heated, as by means of suitable ductwork (not shown).

Valves 31, 32 in fuel lines 34, 35, respectively, regulate operation of burner 20. Valves 31, 32 may be operated by solenoids 31', 32', respectively. Lines 34, 35 connect burner 20 with a suitable source of combustible medium, for example natural gas. When valve 31 is opened, combustible medium flows through line 34 to burner 20 to provide first stage or low heat operation. Suitable ignition means, for example a pilot light (not shown), may be provided to ignite burner 20.

Figure 2:
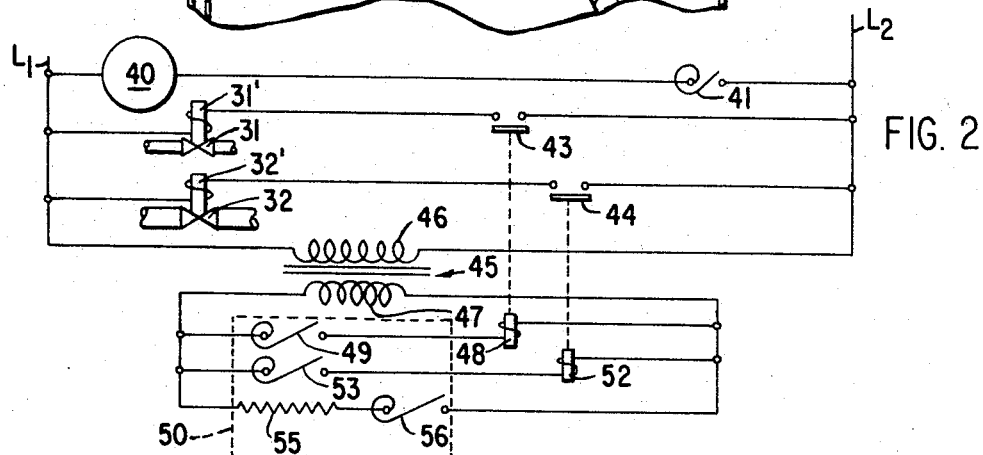
FIGURE 2 is a wiring diagram of the control of the present invention.

Referring to FIGURE 2 of the drawings, motor 40 of fan 30 is connected as by bimetal switch 41 across power leads $L_1$, $L_2$. Leads $L_1$, $L_2$ are connected to a suitable source of alternating current power (not shown). It is understood that a three-phase source of alternating current power may be employed if the circuit is suitably modified. Bimetal switch 41, arranged in heat exchange relation with one of heat exchangers 16, is effective to energize fan motor 40 at a preset temperature of the heat exchanger.

Solenoid 31' of fuel valve 31 is connected through switch 43 across leads $L_1$, $L_2$. Solenoid 32' of fuel valve 32 is connected through switch 44 across the leads $L_1$, $L_2$. The primary winding 46 of step-down transformer 45 is connected across leads $L_1$, $L_2$.

Switching relay 48 is connected through temperature responsive bimetal switch 49 of thermostat 50 across secondary winding 47 of transformer 45. Switching relay 52 is connected through temperature responsive bimetal switch 53 of thermostat 50 across transformer winding 47. Resistance type heater 55 is connected through temperature responsive bimetal switch 56 of thermostat 50 across transformer winding 47. Heater 55 is arranged to heat switches 49, 53, 56 when energized, as will be more apparent hereinafter.

Bimetal switches 49, 53, 56 are of the type which close at a predetermined temperature, the cut-in temperature, and open at a second predetermined temperature, the cut-out temperature. Bimetal switch 49, which controls the operation of the first heating stage, has a cut-in and cut-out temperature higher than the cut-in and cut-out temperatures of bimetal switch 53, which controls operation of the second heating stage. The cut-in and cut-out temperatures of switch 49 may, for example, be 75° F. and 76° F., respectively, while those of switch 53 may be 73° F. and 74° F., respectively.

The cut-out temperature of bimetal switch 56 is less than the cut-in temperature of bimetal switch 49 and greater than the cut-in temperature of bimetal switch 53. The cut-in temperature of switch 56 may be equal to or slightly greater than the cut-in temperature of switch 53. For example, the cut-in and cut-out temperatures of bimetal switch 56 may be 75° F. and 74° F., respectively.

Heater 55, when energized, raises the temperatures of switches 49, 53, 56 a predetermined number of degrees above actual temperatures prevailing in the area heated. Heater 55 may, for example, be selected to bias the temperatures of switches 49, 53, 56 three degrees above temperatures of the area heated. It is understood that when heater 55 is deenergized, the temperatures adjacent switches 49, 53, 56 decrease relatively rapidly to actual area temperatures. Considering the exemplary temperature settings described heretofore, with heater 55 energized, the area temperature at which switches 49, 53, 56 cut in and cut out is 72° F., 73° F.; 70° F., 71° F.; and 72° F., 71° F., respectively.

Figure 3:
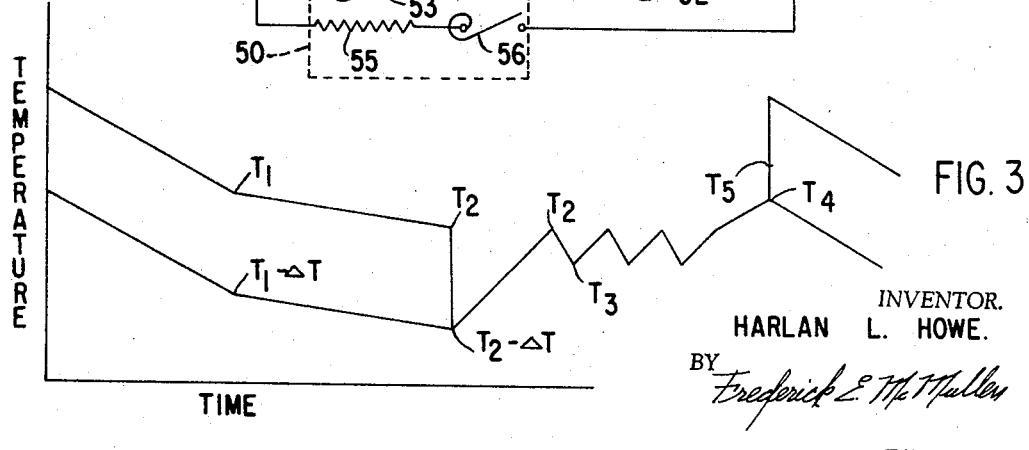
FIGURE 3 is a graphical representation showing the operating sequence of the control of the present invention.

Referring to FIGURES 2 and 3 and presuming temperatures of the area heated to be above the cut-in temperature of bimetal switch 49, switches 49, 53 are open and switching relays 48, 52, deenergized. Relay switches 43 and 44 are, accordingly, open and fuel valves 31, 32 are closed. Fan motor 40 is deenergized. Furnace 10 is accordingly inoperative.

Bimetal switch 56, whose cut-out temperature is below that of switch 49, is closed energizing heater 55 so that temperatures adjacent switches 49, 53, 56 are above temperatures prevailing in the area heated by the amount of heat generated by heater 55.

Should the temperature of the area decrease, bimetal switch 49 will close when the temperature thereof reaches the cut-in temperature of switch 49, designated $T_1$ in FIGURE 3. Actual temperatures in the area heated are less than the temperature sensed by switch 49 by the temperature increment $\Delta T$ supplied by heater 55, or $T_1 - \Delta T$ in FIGURE 3. Closure of switch 49 completes the energizing circuit to switching relay 48, which in turn closes switch 43 energizing solenoid 31'. Solenoid 31' opens fuel valve 31, and furnace 10 operates at the first or low heating stage. Switch 41 closes to energize fan motor 40 at a preset internal furnace temperature.

If the heating capacity of the first heating stage is insufficient to sustain area temperatures, and temperatures within the area decrease, switch 56 opens at the predetermined cut-out temperature thereof, designated $T_2$ in FIGURE 3, to interrupt the energizing circuit to heater 55. Actual area temperatures are $T_2 - \Delta T$. With the deenergization of heater 55, the temperatures of bimetal switches 49, 53, 56 correspond to actual area temperatures. Since the cut-in temperature of bimetal switch 53 is between the cut-out temperature of switch 56 and the cut-out temperature of switch 56 minus the predetermined number of degrees of temperature bias supplied by heater 55, deenergization of heater 55 closes switch 53. Closure of switch 53 completes an energizing circuit to switching relay 52, which in turn closes switch 44 to complete the energizing circuit to solenoid 32'. Solenoid 32' opens fuel valve 32 and furnace 10 operates on the second or high heating stage.

If the heating demand of the area remains relatively high, switch 53 cycles the furnace between the first and second heating stages as temperatures vary between the cut-out and cut-in temperatures thereof, shown as $T_2$, $T_3$ in FIGURE 3. The first heating stage, regulated by switch 49, remains continuously energized while heater 55 is inoperative.

Where the temperature of the area heated rises above the cut-out temperature of switch 53, shown as $T_2$ in FIGURE 3, switch 53 opens to interrupt the energizing circuit to switching relay 52, which in turn opens switch 44 to deenergize solenoid 32' closing fuel valve 32. The first heating stage of furnace 10 continues to operate.

On a subsequent rise in area temperature to the cut-in temperature of switch 56, designated $T_4$ in FIGURE 3, switch 56 closes to complete an energizing circuit to heater 55 which biases temperatures of bimetal switches 49, 53, 56 above actual area temperatures. Where the temperature bias added to switch 49 raises the temperature thereof above the cut-out temperature of switch 49, shown as $T_5$ in FIGURE 3, switch 49 opens to interrupt the energizing circuit to switching relay 48 thereby opening switch 43 and solenoid 31'. Deenergization of solenoid 31' closes fuel valve 31 and furnace 10 is rendered inoperative.

Heater 55 may be arranged to heat second stage bimetal switch 53 only, or second stage switch 53 and heater controlling switch 56. In this arrangement, the deenergization of heater 55, when temperatures circumadjacent switch 56 reach the cut-out temperatures thereof, exposes second stage switch 53 to actual area temperature to close switch 53 and actuate the second heating stage of furnace 10 in the manner described heretofore. It is understood that the cut-in temperature of switch 53 is between the cut-out temperature of switch 56 and the cut-out temperature of switch 56 minus the predetermined number of temperature degree bias afforded by heater 55.

While I have described a preferred embodiment of this invention, it will be understood that the invention is not limited thereto since it may be otherwise embodied within the scope of the following claims.

I claim:

1. In a furnace having first and second heating stages in which the combined heating capacity of said first and second stages is greater than the heating capacity of said first stage alone, the combination of a first control effective at a first temperature to actuate said first stage; a second control effective at a second temperature to actuate said second stage; said first and second controls being arranged to respond to temperature conditions of the area heated; a heater adapted when energized to maintain temperatures circumadjacent said second control a predetermined number of degrees above the temperatures in said area thereby decreasing the response of said second control to actual temperatures in the area heated; and a third control effective at a third temperature to deenergize said heater; said third temperature being at least equal to said second temperature and no greater than the sum of said second temperature and said predetermined number of degrees generated by said heater, said third temperature being less than said first temperature, so that, at said first temperature said first control actuates said first stage to heat said area while at said third temperature, said third control deenergizes said heater whereby temperature circumadjacent said second control relatively quickly decreases to the actual temperature of the area heated, said second control, during said temperature decrease, actuating said second stage at said second temperature.

2. The furnace according to claim 1 in which said heater is arranged to heat said third control.

3. The furnace according to claim 2 in which said heater is arranged to heat said first control.

References Cited

UNITED STATES PATENTS 2,329,682  9/1943  Alfery _____ 236—1
2,549,952  4/1951  Wheelock _____ 236—91

EDWARD J. MICHAEL, *Primary Examiner.*